United States Patent [19]

Hilgner et al.

[11] 4,164,056

[45] Aug. 14, 1979

[54] LEG HOLDING MACHINE

[76] Inventors: Otto L. Hilgner, 1340 Fairground Rd., Hatfield, Pa. 19440; Donald Gouldey, 660 Clemens Rd., Telford, Pa. 18969

[21] Appl. No.: 843,582

[22] Filed: Oct. 19, 1977

[51] Int. Cl.$^2$ .............................................. A22B 5/16
[52] U.S. Cl. ........................................ 17/21; 17/44.3
[58] Field of Search .................... 17/21, 44, 44.3, 50; 269/190

[56] References Cited

U.S. PATENT DOCUMENTS

| | | | |
|---|---|---|---|
| 3,220,051 | 11/1965 | Fill | 17/21 |
| 3,348,261 | 10/1967 | Segur | 17/50 X |
| 3,863,294 | 2/1975 | Barbee | 17/21 |

Primary Examiner—Travis S. McGehee
Attorney, Agent, or Firm—Joseph W. Molasky & Associates

[57] ABSTRACT

A machine for holding the legs of animal carcasses to support a carcass during an up-pull skinning operation is provided with a jaw means for gripping a pair of legs of the carcass individually and holding the gripped legs in a side-by-side relation, means for moving the jaw means between open and closed positions and means for moving the jaw means to a desired elevated position.

11 Claims, 12 Drawing Figures

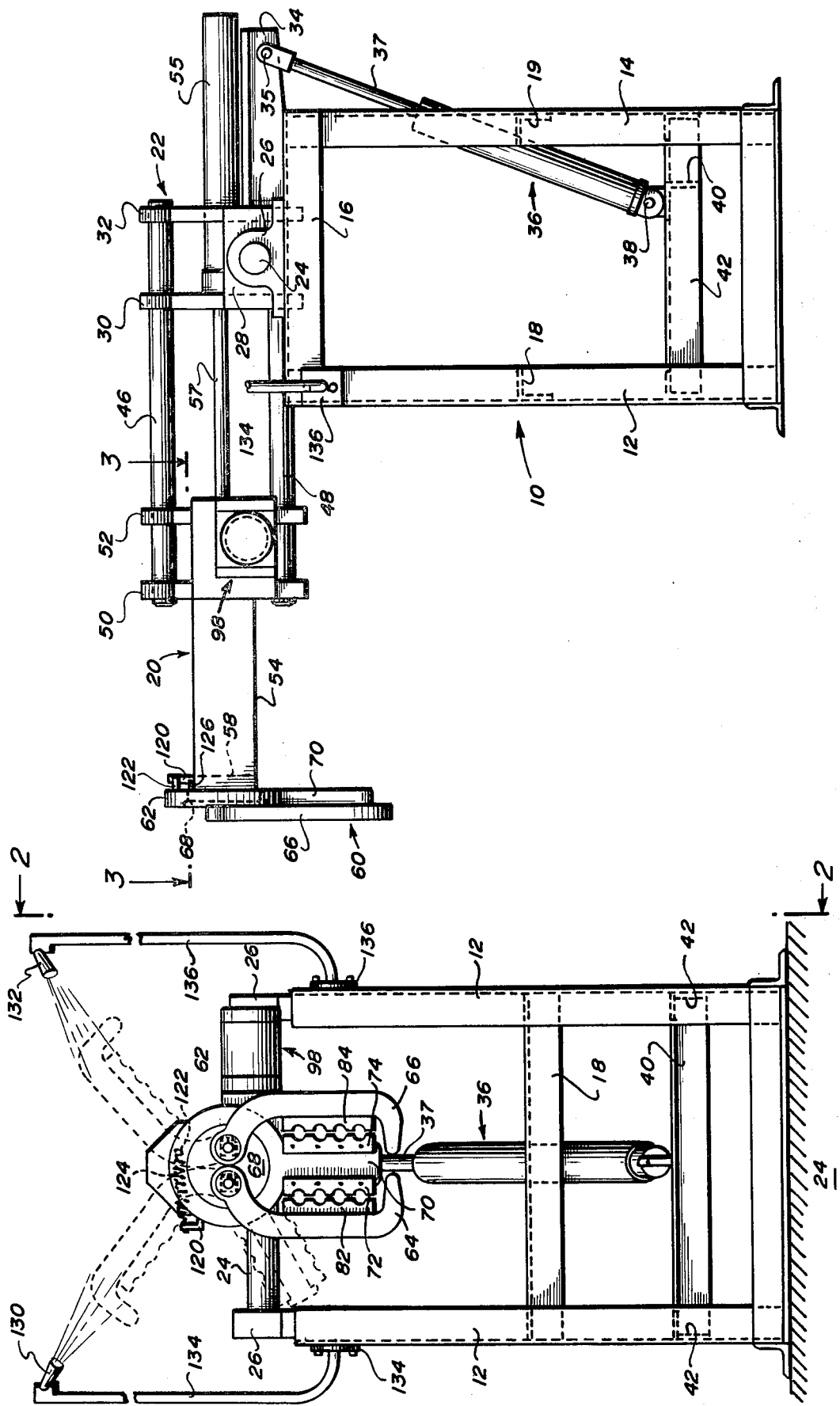

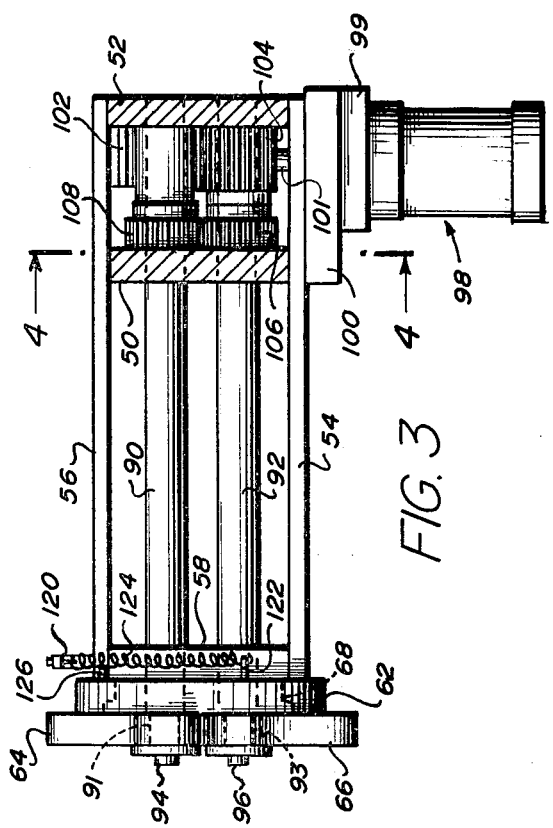
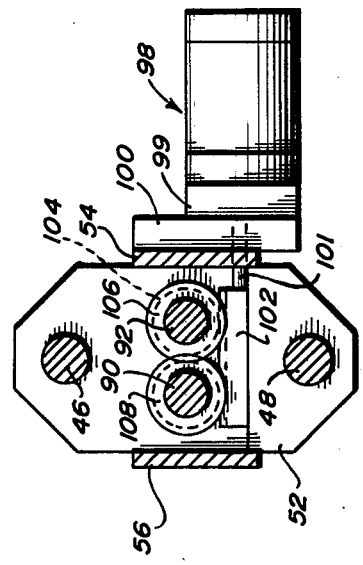
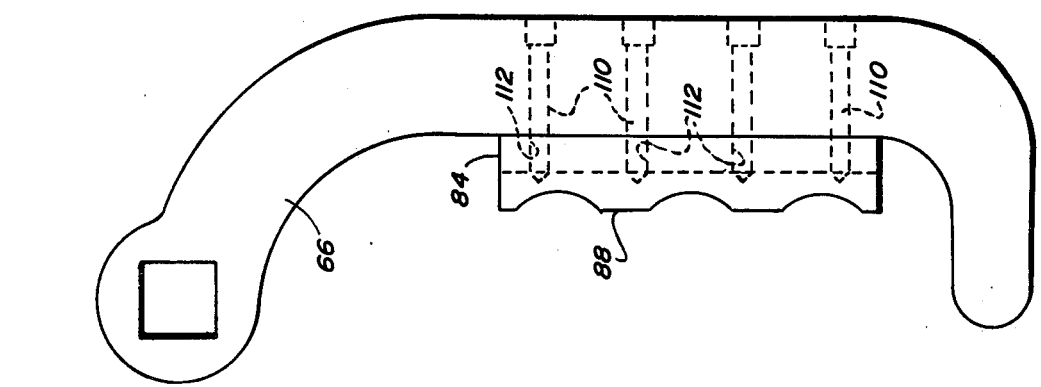
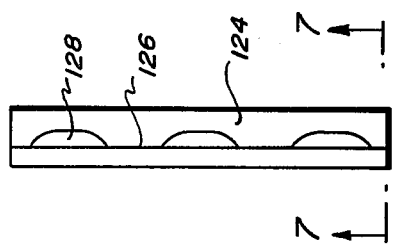
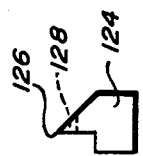

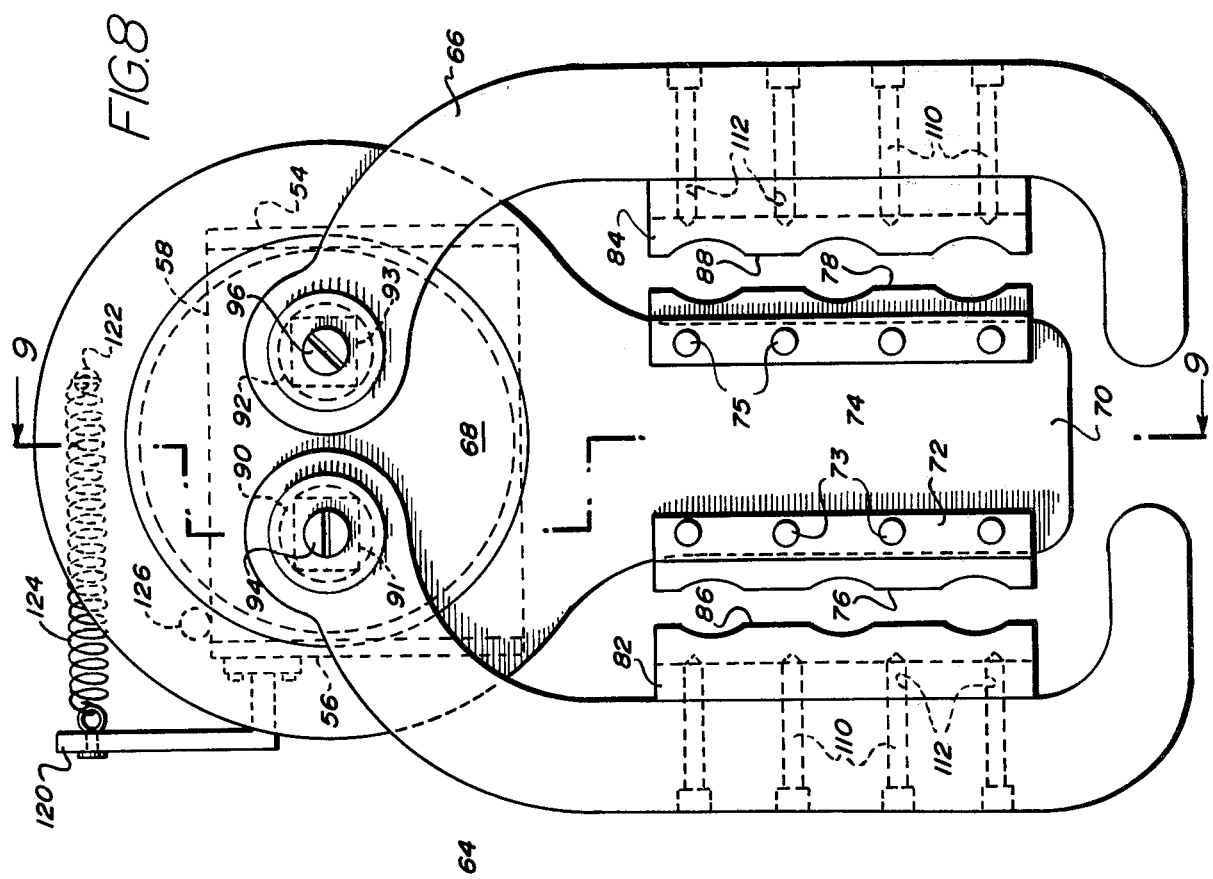
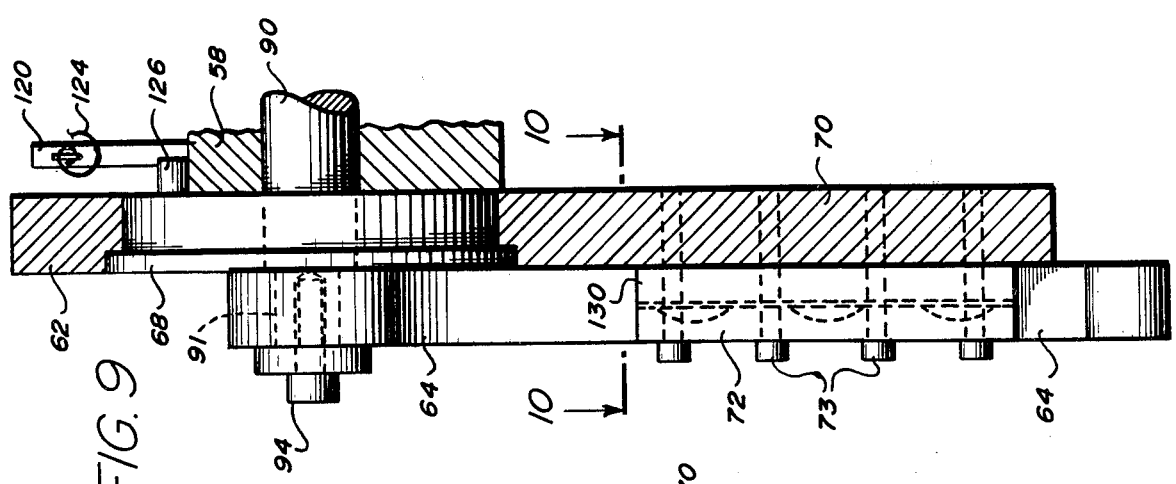
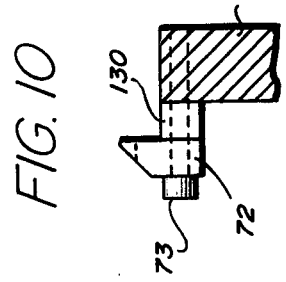

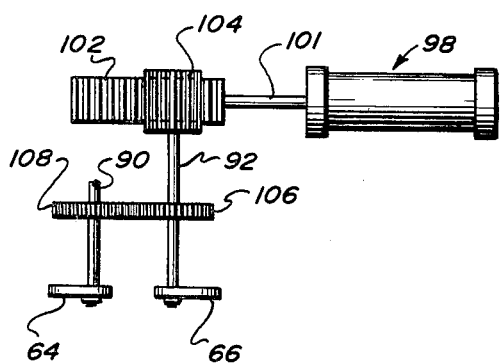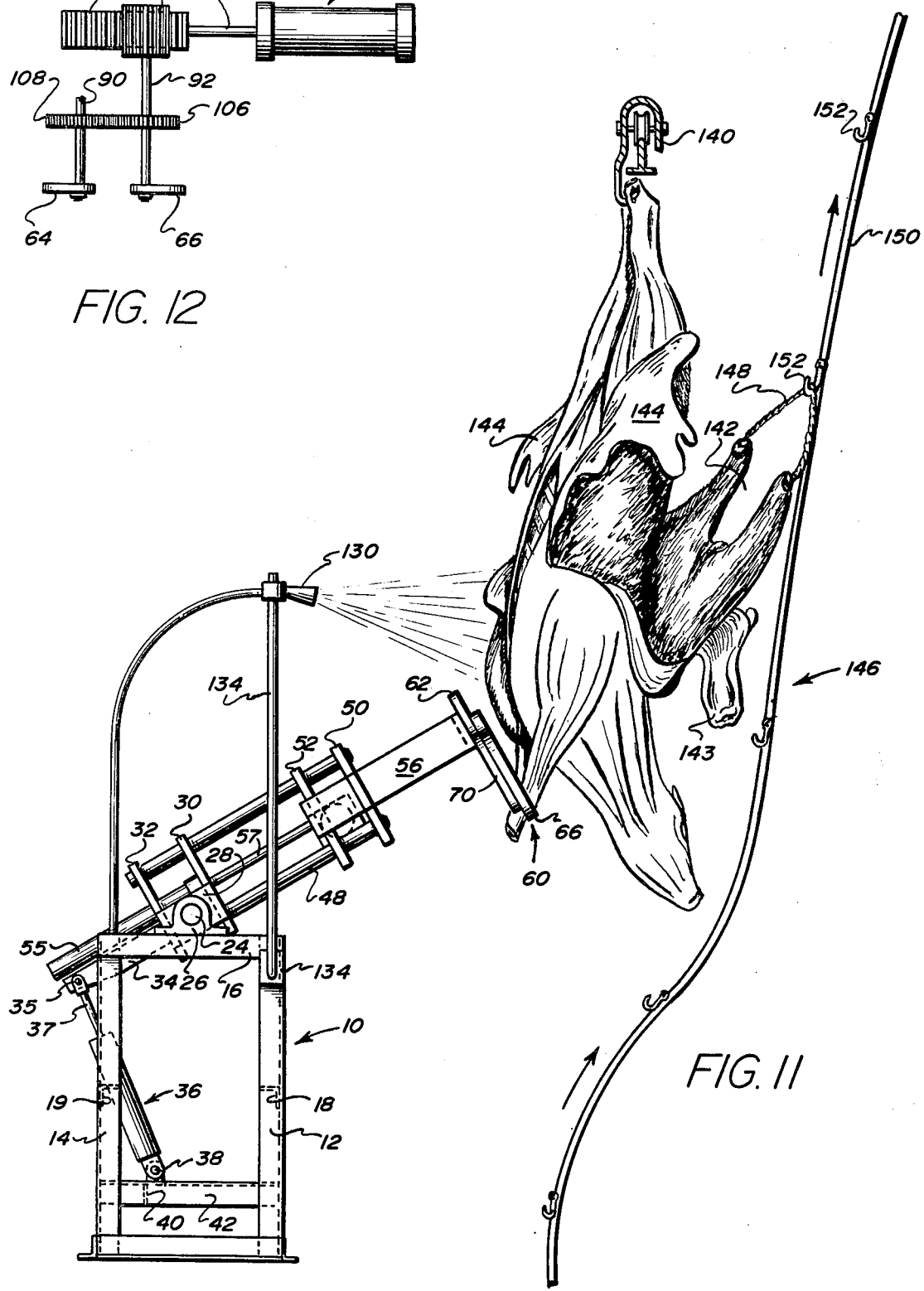

LEG HOLDING MACHINE

BACKGROUND AND SUMMARY OF THE INVENTION

This invention is directed to a machine useable in the meat packing and slaughtering industry for holding the legs of animal carcasses to support a carcass during a hide stripping operation. The machine is especially designed for holding the front legs of an animal carcass during an up-pull skinning operation.

In one type of hide stripping method in use in the slaughtering of beef carcasses or the like, the partially skinned carcass is hung vertically from a conveyor by its rear legs and is held at its front legs while the hide is pulled from the carcass by a hide stripping chain means connected to the partially skinned hide. In this method the front legs of the carcass are held by manually chaining them to vertical posts.

This prior art method involving the chaining of the front legs has several problems. Firstly, the method is time consuming and involves a substantial amount of manual labor. Also, the method cannot be incorporated efficiently into an automatic processing line type of operation. Furthermore, in the prior art method it is difficult to keep the chain in a clean and sterilized condition.

It is the general object of the invention to provide a machine for holding the legs of an animal carcass during a hide stripping operation which overcomes the above-discussed problems of the prior art hide stripping method.

To this end, the machine of the invention is comprised of a jaw means for gripping individually a pair of legs of a carcass and holding the gripped legs in a stable position in side-by-side relation, means for moving the jaw means between open and closed positions and means for moving the jaw means to a desired elevation. In accordance with a more specific aspect of the invention, the means for moving the jaw means to a desired elevation includes means for reciprocating the jaw means back and forth along a path of movement and means for pivoting said reciprocating means about an axis transverse to the path of movement. Also, the various means for moving the jaw means are power operated to provide rapid and powerful movements and a secure gripping action of the carcass legs by the jaw means.

By reason of the above-described construction, the leg holding machine of the invention replaces the hand chaining procedure used in the prior art method of up-pull hide stripping. The machine of the invention eliminates a large portion of the manual labor required in securing the front legs of the carcass prior to the up-pull skinning operation and the subsequent release of the front legs to permit the stripped carcass to be moved to the next slaughtering station.

In addition, the machine is adapted for use in an automated processing line since once the legs of the carcass are clamped in the machine, there is no need for any worker to approach the leg gripping area during the entire hide stripping operation. With the prior method, the worker had to release the chain from its engagement with the front legs of the carcass after the hide had been pulled from the carcass to allow the carcass to be moved to the next slaughtering station. This manual procedure is not necessary with the leg holding machine of the invention because the machine is operated automatically to open its jaws to release the grip on the carcass legs. Accordingly, the leg releasing step can be performed more quickly and more reliably. Furthermore, with the use of the leg holding machine of the invention it is possible to incorporate a washing step at the end of the up-pull skinning operation in a manner such that the washing step can be performed automatically at a set time period in the hide skinning operation. The washing step serves to clean and sterilize the carcass and is an essential step in hide stripping. With the prior method the washing step often had to be delayed and could not be performed reliably in a predetermined period of time because of the varying time required for a worker to unchain the front legs of the carcass. The workers are often hindered by the slippery floor conditions in the leg gripping area resulting from the washing step.

Another feature of the invention is that the jaws of the leg holding machine can be kept much cleaner than the chains used with the prior method to thereby provide a more sanitary type of operation.

A further feature of the invention is that the leg holding machine holds the carcass legs in a very secure and stable position during the up-pull skinning step to thereby provide a more reliable operation as compared with the previous hand chaining methods.

Another feature of the invention is that while the carcass is being held in a stable vertical position symmetrically located with reference to the machine, it lends itself to be used in conjunction with an automatic brisket cutting operation.

BRIEF DESCRIPTION OF THE DRAWING

FIG. 1 is a front elevation of a leg holding machine in accordance with the invention;

FIG. 2 is a side elevation of a leg holding means in accordance with the invention as viewed on line 2—2 of FIG. 1;

FIG. 3 is a top plan view of the head unit of the leg holding machine of the invention as viewed on line 3—3 of FIG. 2;

FIG. 4 is a sectional view taken on line 4—4 of FIG. 2;

FIG. 5 is a detail view of a jaw member;

FIG. 6 is a detail view of a jaw mounted on the jaw member shown in FIG. 5;

FIG. 7 is an end view of FIG. 6 as viewed on line 7—7 of FIG. 6;

FIG. 8 is a front elevation of the jaw means;

FIG. 9 is a sectional view taken on line 9—9 of FIG. 8;

FIG. 10 is a sectional view taken on line 10—10 of FIG. 9;

FIG. 11 is a view illustrating a carcass breaking operation utilizing the leg holding means of the invention; and FIG. 12 is a partly diagrammatic view of the jaw drive mechanism.

DETAILED DESCRIPTION OF THE PREFERRED EMBODIMENTS

The leg holding means of the invention comprises a stand 10 having an open box-like construction and including two front corner uprights 12 and two rear corner uprights 14, a pair of horizontal supports 16 mounted on top of and extending between opposed uprights 12 and 14 and a pair of horizontal crossbars 18 and 19 extending between the front uprights 12 and the rear uprights 14, respectively.

The leg holding machine also comprises a head unit 20 and a support assembly 22 for pivotally supporting head unit 20 on stand 10. Support assembly 22 comprises a pivot bar 24 journalled at its ends in bearing members 26 mounted on top of supports 16 with pivot bar 24 extending horizontally across the top of stand 10. Support assembly 22 also includes a pair of spaced apart side plates 28 mounted on pivot bar 24, front end plate 30, a rear end plate 32, and an arm 34 secured to rear end plate 32 and projecting rearwardly therefrom. Plates 28, 30 and 32 and arm 34 are joined together by bolts to pivot as a unit about the horizontal axis of pivot bar 24 as the latter rotates in bearing members 26.

Power operated means are provided for actuating support assembly 22 to pivot about the horizontal axis of pivot bar 24, said means comprising a hydraulic cylinder means 36 pivotally mounted at one end on a pivot pin 38 mounted on a bar 40 supported at its ends on stand 10 by a pair of crossbars 42 extending between an upright 12 and an upright 14. Cylinder means 36 has its actuating rod 37 pivotally connected at its extended end to arm 34 at a pivot 36. Cylinder means 36 is operated hydraulically to move actuating arm 37 between the extended position shown in FIG. 2 and a retracted position to actuate the support assembly 22 to pivot about the horizontal axis of pivot bar 24. Crossbar 19 is provided with a cutout to clear cylinder means 36 during its actuating movement.

Means are provided for mounting the head unit 20 on support assembly 22 so that the head unit 20 is movable toward and away from support unit 22. To this end, a pair of horizontal extending and vertically spaced guide bars 46 and 48 are carried by and secured in plates 30 and 32 to extend forwardly from plate 30. Guide bars 46 and 48 serve as ways for supporting the guiding head unit 20 which is mounted on guide bars 46 and 48 for slidable movement thereon toward and away from support assembly 22.

Head unit 20 comprises a front plate 50 and a rear plate 52 slidably mounted on guide bars 46 and 48, a pair of side plates 54 and 56 secured to plates 50 and 52 by mounting screws, and a jaw support plate 58 mounted on the forward end of side plates 54 and 56 by mounting screws. A jaw means 60 is carried on the forward end of head unit 20 at support plate 58 as will be described more fully hereafter.

Power operated means are provided for actuating head unit 20 and jaw means 60 carried thereby through a reciprocating movement back and forth along guide bars 46 and 48. Such power operated means comprises a hydraulic cylinder means 55 mounted on plate 30 and extending through plate 32 and having an actuating rod 57 connected at its extended end to plate 52 of head unit 20. Cylinder means 55 is operated hydraulically to move actuating arm 57 between the extended position shown in FIG. 2 and a retracted position to actuate the head unit 20 back and forth along guide bars 46 and 48. During this reciprocating movement of head unit 20, plates 50 and 52 and the parts carried thereby slide along guide bars 46 and 48.

Jaw means 60 comprises a plate 62 and a pair of jaw members 64 and 66 mounted on the forward end of head unit 20 as will be described more fully hereafter. Plate 62 is rotatably mounted on the periphery of a circular member 68 fixedly mounted on plate 58 of head unit 20 by mounting screws. Plate 62 has a tongue portion 70 extending downwardly as viewed in FIG. 1. A pair of jaws 72 and 74 are mounted on a tongue portion 70 by means of suitable mounting screws 73 and 75, respectively. Jaw 72 is provided with an outwardly facing undulating edge 76 and jaw 74 is provided with an outwardly facing undulating edge 78. Jaw member 64 has a generally C-shaped configuration extending around jaw 72 and carries a jaw 82 in opposed relation to jaw 72. Jaw member 66 has a generally C-shaped configuration extending around jaw 72 and carries a jaw 84 facing jaw 74 in opposed relation. Jaw 82 is provided with an undulating edge 86 facing undulating edge 76 and jaw 84 is provided with an undulating edge 88 facing undulating edge 78 as is shown in FIG. 1.

Jaw member 64 is secured at its upper end to the end of a shaft 90 which extends through and is rotatably supported in plates 58, 50 and 52. Jaw member 66 is secured at its upper end to the end of a shaft 92 which extends through and is rotatably supported in plates 58, 50 and 52.

Shafts 90 and 92 are parallel to one another and at their forward ends extend through holes in circular member 68 to provide square-shaped projecting end portions 91 and 93 to which the jaw members 64 and 66 are secured for rotation with the associated shaft 90 and 92. Jaw member 64 has a square hole which fits onto end portion 91 and it is secured onto the end of shaft 90 by a screw 94 which extends through a washer to threadedly engage the end of shaft 90. Jaw member 66 has a square hole which fits onto end portion 93 and is secured onto the end of shaft 92 by a screw 96 which extends through a washer to threadedly engage the end of shaft 92. By this arrangement, the jaw members 64 and 66 rotate together with their associated shafts 90 and 92.

Means are provided for actuating the jaw members 64 and 66 to move in unison toward each other and in unison away from each other between a closed or leg clamping position and an open or leg unclamping position. Such means comprises a hydraulic cylinder means 98 mounted on the side plate 54 by means of suitable mounting screws cooperating with a bracket 100 and spacer 99. Cylinder means 98 is arranged so that its actuator rod 101 is reciprocated along an axis transverse to and beneath the axes of shafts 90 and 92. This arrangement is apparent from a consideration of FIGS. 3 and 4.

Actuator rod 101 is operatively connected to shafts 90 and 92 by means of a rack and gear means for causing shafts 90 and 92 to rotate in unison as the actuator rod 101 is reciprocated back and forth by operation of the cylinder means 98 (See FIG. 12). The rack and gear means comprises a rack 102, which is carried on the extended end of actuator rod 101 and engaged with a gear 104 fixedly mounted on shaft 92. Shaft 92 has a second gear 106 fixedly mounted thereon and arranged to engage a gear 108 fixedly mounted on shaft 90.

As actuator rod 101 is extended (i.e., moved to the left as viewed in FIG. 4) shaft 92 is caused to rotate in a clockwise direction (by reason of the cooperation of rack 102 and gear 104) and shaft 90 is caused to rotate in a counterclockwise direction (by reason of the cooperation between gear 106 and gear 108). With actuator rod 101 in the fully extended position, as is shown in FIG. 4, jaw members 64 and 66 have been moved to the fully closed position. The actuator rod 101 is actuated to this position to clamp a carcass leg between jaws 72 and 82 and between jaws 74 and 84 as will be described hereafter.

As actuator rod 101 is retracted (moved to the right as viewed in FIG. 4) shaft 92 is caused to rotate in a counterclockwise direction (by reason of the cooperation of rack 102 and gear 104) and shaft 90 is caused to rotate in a clockwise direction (by reason of the cooperation between gear 106 and gear 108). With actuator rod 101 in the fully retracted position jaw members 64 and 66 are in the fully opened position (as shown in dashed lines in FIG. 1). Actuator rod 101 is actuated to this position to unclamp a carcass leg or to be set to receive a carcass leg to be clamped as will be described hereinafter.

The construction of jaw members 64 and 66 is shown in detail in FIGS. 5-7. Various of the details of the jaw members 64 and 66 shown in FIGS. 5-7 have been deleted from FIGS. 1-4 for the sake of clarity of illustration. In FIGS. 5-7 there is shown in detail the construction of jaw member 66 and jaw 84 mounted thereon. Jaw 84 is mounted on a straight leg portion of jaw member 64 by means of four screws 110 received in counterbored holes in jaw member 64 as is best shown in FIG. 5. The screws 110 engage threaded holes 112 in jaw 84.

Jaw 84 is constructed of a metal bar having an elongated projection 124 tapered to a narrow edge 126. Edge 126 is provided with three recesses 128. This construction forms a generally undulating edge 86 for engaging the leg of the animal carcass. Jaw 84 is mounted on jaw member 66 with the undulating edge 88 thereof facing inwardly.

Jaw 82 has the same construction as jaw 84 and is constructed and arranged on jaw member 64 in the same manner as jaw 84 is constructed and aranged on jaw 66.

Jaws 72 and 74 are also constructed in the same manner as jaw 84 as described in detail above, jaws 72 and 74 being provided with undulating narrow edges 76 and 78, respectively, facing the edges 86 and 88 of opposing jaws 82 and 84 as is shown in FIG. 2.

Referring to FIGS. 1 and 8-10, jaws 72 and 74 are each mounted on tongue portion 70 of member 62 by four mounting screws 73 and 75, respectively, threadedly engaged in threaded holes in tongue portion 70. A spacer 130 is positioned between jaw 72 and tongue portion 70 to space jaw 72 from tongue portion 70 an amount so as to align the undulating edge 76 of jaw 72 with the undulating edge 86 of jaw 82. A similar spacer is provided for aligning the undulating edge 78 of jaw 74 with the undulating edge 88 of jaw 84.

The construction and arrangement of jaws 72, 74, 82 and 84 is such that one carcass leg is gripped securely between jaws 72 and 82 and a second carcass leg is gripped securely between jaws 74 and 84 in side-by-side relation to one another. Moreover, jaw means 60 can be elevated to a desired position in accordance with the size of the carcass to present the jaws 72, 74, 82 and 84 in the best position for gripping the front legs of the carcass. Jaw means 60 is actuated to this desired position by operation of hydraulic means 36 and 55. By operation of hydraulic means 36 the support assembly 22 is pivoted to present the guide members 46 and 48 at a desired angle to the horizontal. By operation of hydraulic means 55 the head unit 20 and the jaw means 60 mounted thereon are reciprocated along guide bars 46 and 48 to a desired position. Once jaw means 60 is positioned at the desired elevation, hydraulic means 98, which has been previously automatically operated to actuate the jaw members 64 and 66 to an open position to release the carcass legs at the end of a previous skinning operation, is then operated to actuate jaw members 64 and 66 to a closed position to clamp the legs of the next carcass to be skinned between cooperating jaws 72 and 82 and cooperating jaws 74 and 84.

As is best shown in FIGS. 1-3, spring means are provided for returning rotatable plate 62 to the position in which tongue portion 70 extends vertically downwardly after tongue portion 70 has been rotated from this position to a position such as the dashed line position shown in FIG. 1. Tongue portion 70 is moved from the vertical position to the turned or dashed line position of FIG. 1 by movement of the carcass out of the hide stripping station to the next slaughtering station. This movement is to the left as viewed in FIG. 1 and occurs after the hide has been skinned from the carcass and the jaw members 64 and 66 have been actuated to the open position shown in dashed lines FIG. 1. Tongue portion 70 is moved to the left in the same direction as the carcass movement by reason of its contact with the carcass leg previously gripped between jaws 74 and 84. Typically, tongue portion 70 will clear this carcass leg after being rotated to a position such as is shown in dashed lines FIG. 1. The spring means then serves to return tongue portion 70 to the centered or vertical position shown in solid lines in FIG. 1 in preparation for a subsequent leg gripping operation.

The spring return means comprises a vertically extending spring support 120 mounted on plate 56, a horizontally extending pin 122 mounted near the top of plate 62, and a tension spring 124 connected at its ends to the top of support 120 and to pin 122 to extend horizontally therebetween as shown in FIG. 1. A stop pin 126 is also provided and serves to locate tongue portion 70 in the central position by being constructed and arranged to cooperate with plate 58 to limit the counterclockwise rotation of plate 62. By this arrangement, spring 124 is expanded and tensioned as the tongue portion 70 rotates in a clockwise direction as viewed in FIG. 1 and biases the plate 62 to the solid line position of FIG. 1. Once the tongue portion 70 is clear of the carcass leg, the spring 124 contracts to return the tongue portion 70 to the solid line position.

A pair of washing heads 130 and 132 are supported on the stand 10 by means of a pair of wash head mounts 134 and 136. The washing heads are directed to dispense shower-like streams of hot water onto the complete chest and leg area of the carcass as is best shown in FIG. 11.

The use of the leg holding machine of the invention for holding the front legs of the carcass during an up-pull skinning operation is illustrated in FIG. 11. As is shown in this Figure, an animal carcass is supported to hang vertically from a conveyor 140 by means of its rear legs. The front legs of the carcass are held by jaw means 60 of the leg holding machine of the invention. Hide flaps 142 from the front legs, hide flap 143 from the head and hide flaps 144 from the legs are previously skinned from the carcass and are allowed to hand loosely in preparation for a skin-pulling operation. The flaps 142 from the front legs are then connected to a hide stripping machine 146 by means of a yoke type of chain assembly 148. The stripping machine 146 comprises a chain 150 moving in the direction shown by the arrow in FIG. 11 and comprises a plurality of hook members 152 adapted to be engaged by the chain assembly 148. As the yoke in the center of the chain assembly 148 is secured to the hide stripped chain 150, the hide is pulled back and up while the leg holding machine holds the previously clamped front legs in a stable position. As the yoke of chain assembly 148 is moved upwardly, the hide is removed from the carcass. Near the end of the hide stripping operation, the front leg area and the leg clamping area is automatically washed with hot water by directing streams of hot water from the washing heads 130 and 132 as shown in FIG. 11.

The leg holding machine is adapted for use in an automatic processing line in which case the machine is timed to automatically release its grip on the front legs prior to a pull-out movement of the carcass, i.e., the movement of the carcass out of the hide stripping station by an automatic conveyor system. It is noted that as the carcass is moved out of the hide stripping station the tongue portion 70 is rotated to accommodate the movement of the front legs of the carcass. Then the carcass leg clears the tongue portion 70, the spring return means operates to return the tongue portion 70 to the centered vertically extending position in preparation for a subsequent leg gripping operation.

What is claimed is:

1. A machine for holding the legs of animal carcasses to support a carcass during a slaughtering operation such as hide stripping or up-pull skinning comprising:
    jaw means for gripping individually a pair of legs of a carcass and holding the gripped legs in side-by-side relation,
    means for moving said jaw means between open and closed positions, and
    means for moving said jaw means to a desired elevated position to position the same for receiving the carcass legs to be gripped thereby,
    said means for moving said jaw means to a desired elevated position including means for reciprocating said jaw means back and forth along a path of movement and means for pivoting said reciprocating means about an axis transverse to said path of movement.

2. A machine according to claim 1 wherein said means for moving said jaws between open and closed position is power operated.

3. A machine according to claim 2 wherein said reciprocating means for said jaw means is power operated and said means for pivoting said reciprocating means is power operated.

4. A machine according to claim 1 including means directing streams of hot water onto the carcass leg holding area for cleaning and sterilizing the same.

5. A machine according to claim 1 constructed and arranged for cattle hide stripping wherein said means for moving said jaw means between open and closed positions includes hydraulically operated means producing a jaw closing force sufficient to hold said jaws closed to hold and said gripped legs against the forces produced during the hide stripping of the cattle carcass.

6. A machine for holding the legs of cattle carcasses to support a carcass during a slaughtering operation such as hide stripping or up-pull skinning comprising:
    jaw means for gripping individually a pair of legs of a carcass and holding the gripped legs in side-by-side relation, and
    means for moving said jaw means between open and closed position,
    said jaw means comprising first and second movably mounted jaw members and means for actuating said first and second jaw members to move in unison toward each other and in unison away from each other, and a third jaw member positioned between said first and second jaw members.

7. A machine according to claim 6 wherein said jaw members are constructed and arranged so that one leg of a carcass is gripped between said first jaw member and a first jaw portion of said third jaw member and a second leg of a carcass is gripped between said jaw member and a second jaw portion of said third jaw member.

8. A machine according to claim 7 wherein said first and second jaw members are provided with carcass leg engaging portions having an undulating edge facing a jaw portion of said third jaw member, said first jaw portion of said third jaw member having an undulating edge facing said undulating edge of said first jaw member, and said second jaw portion of said third jaw member having an undulating edge facing said undulating edge of said second jaw member.

9. A machine according to claim 7 wherein said jaw means is provided with a first rotatable shaft operatively engaged with said first jaw member and, a second rotatable shaft extending parallel to said first rotatable shaft and operatively engaged with said second jaw member.

10. A machine according to claim 9 wherein said means for moving said jaw means comprises means for rotating said first and second rotatable shafts in opposite directions in unison for causing said movement of said first and second jaw members toward and away from each other.

11. A machine according to claim 7 including spring means for biasing said third jaw member to a leg gripping position and wherein said jaw member is rotatably mounted for movement out of said leg gripping position to permit a carcass leg to move freely from its gripped position.

* * * * *